US012703270B2

(12) United States Patent
Yoo et al.

(10) Patent No.: US 12,703,270 B2
(45) Date of Patent: Aug. 11, 2026

(54) SEAT SWIVEL DEVICE FOR VEHICLE

(71) Applicant: HYUNDAI TRANSYS INC., Seosan-si (KR)

(72) Inventors: Eom-Seok Yoo, Hwaseong-si (KR); Hee Jun Park, Hwaseong-si (KR); Yong Seong Jang, Gunpo-si (KR)

(73) Assignee: HYUNDAI TRANSYS INC., Seosan-si (KR)

( * ) Notice: Subject to any disclaimer, the term of this patent is extended or adjusted under 35 U.S.C. 154(b) by 214 days.

(21) Appl. No.: 18/413,812

(22) Filed: Jan. 16, 2024

(65) Prior Publication Data

US 2024/0253532 A1 Aug. 1, 2024

(30) Foreign Application Priority Data

Jan. 27, 2023 (KR) ........................ 10-2023-0011009

(51) Int. Cl.
*B60N 2/14* (2006.01)

(52) U.S. Cl.
CPC ...................................... *B60N 2/14* (2013.01)

(58) Field of Classification Search
CPC ........................................................ B60N 2/14
See application file for complete search history.

(56) References Cited

U.S. PATENT DOCUMENTS 9,969,301 B2 5/2018 Adam
10,688,889 B2 * 6/2020 Feng .................. B60N 2/42736
11,407,336 B2 * 8/2022 Tibbits ...................... B60N 2/14
11,701,986 B2 * 7/2023 Feng .................. B60N 2/02246 297/344.2
12,071,047 B2 * 8/2024 Feng .................. B60N 2/02246
2022/0009757 A1 1/2022 Dykstra
2024/0391364 A1 * 11/2024 Mochizuki ............... B60N 2/14

FOREIGN PATENT DOCUMENTS

CN 118948056 A * 11/2024 ............... B60N 2/14
CN 120056821 A * 5/2025 ............... B60N 2/14
EP 3489079 B1 9/2021
GB 2459132 A 10/2009
JP H10217811 A * 8/1998 ............. F16C 33/41

(Continued)

OTHER PUBLICATIONS

Written Decision on Registration in Korean Patent Application No. 10-2023-0011009 dated Sep. 16, 2024.

*Primary Examiner* — Timothy J Brindley
(74) *Attorney, Agent, or Firm* — Quantum Patent Law Firm; Seongyoune Kang

(57) ABSTRACT

Disclosed is a seat swivel device for a vehicle, configured to improve a swivel rail so as to have a structure including an inner slide end of the swivel rail and an outer slide end thereof respectively formed on the inner side of a mounting plate and the outer side thereof, to allow the inner slide end to be inserted into and coupled to a space between first and second balls, to allow the outer slide end to be inserted into and coupled to a space between third and fourth balls, and to cause a load of a passenger seated on a seat to be evenly dispersed and supported by the inner slide end and the outer slide through the mounting plate, thereby reliably preventing occurrence of sagging, deformation, and vibration in the swivel rail during seat swivel operation.

18 Claims, 4 Drawing Sheets

(56) References Cited

FOREIGN PATENT DOCUMENTS

| | | | | | |
|---|---|---|---|---|---|
| JP | 2004196091 | A | | 7/2004 | |
| JP | 2019099144 | A | | 6/2019 | |
| JP | 2022097345 | A | | 6/2022 | |
| KR | 20190048405 | A | * | 5/2019 | ............... B60N 2/14 |
| KR | 20240002295 | A | * | 1/2024 | ............... B60N 2/14 |
| WO | WO-2023225397 | A1 | * | 11/2023 | ............... B60N 2/14 |

* cited by examiner

LOAD APPLYING POINT
72
63
60
64
61
22
41
10
20
21
40
62
30
70
50
51
31
32

130
100
150
151
A
A

SEAT SWIVEL DEVICE FOR VEHICLE

CROSS-REFERENCE TO RELATED APPLICATION

This application claims priority, under 35 U.S.C. § 119(a), from Korean Patent Application No. 10-2023-0011009, filed on Jan. 27, 2023, the entire contents of which are incorporated herein by reference.

BACKGROUND

(a) Technical Field

The present disclosure relates to a seat swivel device for a vehicle. More particularly, it relates to a seat swivel device for a vehicle configured to prevent occurrence of sagging, vibration, and deformation in a swivel rail or the like during seat swivel operation.

(b) Background Art

Recently, in preparation for launch of an autonomous vehicle capable of traveling without direct control of a driver, research and development (R&D) has been actively conducted on a seat including various mechanisms for conversation and meeting between occupants, relaxation and sleeping, and assistance in entering and exiting the vehicle.

For example, a swivel seat capable of rotating a seat in a desired direction has been developed in order to support multilateral meetings and conversations, external scenery viewing, relaxation and sleeping, assistance in entering and exiting the vehicle, and the like.

The swivel seat refers to a seat in which a swivel device having a predetermined mechanism is installed at the bottom of the seat.

Here, a seat swivel device of the related art will be described below.

FIG. 1 is an enlarged cross-sectional view of a main part of a conventional seat swivel device, and reference numeral 10 indicates a support plate.

The support plate 10 is fixedly mounted on a floor panel in a vehicle or is movable forwards and rearwards on a seat rail mounted on the floor panel.

A first fixing plate 20 is stacked on the upper surface of the support plate 10 so as to be fixedly mounted thereon through a first bolt 22 or the like. A second fixing plate 30 is stacked on the upper surface of the first fixing plate 20 so as to be fixedly mounted thereon through a second bolt 32 or the like.

More specifically, the outer peripheral end of the support plate 10 and the outer peripheral end of the first fixing plate 20 are in close contact with each other, and the same are coupled to each other by the first bolt 22. The inner peripheral end of the first fixing plate 20 and the inner peripheral end of the second fixing plate 30 are in close contact with each other, and the same are coupled to each other by the second bolt 32.

In this case, the outer peripheral end of the second fixing plate 30 is bent more than two steps upwards from the inner peripheral end. Accordingly, the second fixing plate 30 is in a state of being spaced apart from the upper surface of the first fixing plate 20 by a predetermined distance.

In addition, a first seating groove 21 is formed at a location between the outer peripheral end and the inner peripheral end on the upper surface of the first fixing plate 20, in which the first seating groove 21 allows a first ball 41 of a first retainer 40 to be rollably seated therein. A second seating groove 31 is formed on the lower surface of the outer peripheral end of the second fixing plate 30, in which the second seating groove 31 allows a second ball 51 of a second retainer 50 to be rollably seated therein.

Preferably, the first retainer 40 may have a structure configured to allow a plurality of first balls 41 to be rollably stored therein at equal intervals in the circumferential direction, and the second retainer 50 may have a structure configured to allow a plurality of second balls 51 to be rollably stored therein at equal intervals in the circumferential direction.

A swivel rail 60 having a circular structure for a seat swivel operation is inserted into a space between the first ball 41 and the second ball 51 so as to be slidably moved in the circumferential direction. A swivel plate 70 is stacked on the upper surface of the swivel rail 60, and the swivel plate 70 and the swivel rail 60 are coupled to each other by a third bolt 72.

More specifically, the swivel rail 60 includes a mounting plate 63 coupled to the swivel plate 70 by the third bolt 72 and a slide end 64 bent downwards from the mounting plate 63 and inserted into a space between the first ball 41 and the second ball 51 so as to be slidably moved in the circumferential direction.

Particularly, a first rail groove 61 configured to allow the first ball 41 to be rollably stored therein and a second rail groove 62 configured to allow the second ball 51 to be rollably stored therein are respectively formed on the lower surface and the upper surface of the slide end 64 of the swivel rail 60.

Meanwhile, although not shown, a seat cushion frame of the seat is stacked on and coupled to the upper surface of the swivel plate 70, and a drive device (not shown) including a motor is connected to the swivel plate 70 to apply rotational force thereto.

Therefore, when rotational force is applied to the swivel plate 70 by driving the drive device, the swivel plate 70 is rotated with the swivel rail 60, thereby performing a seat swivel operation.

More specifically, as described above, the first ball 41 and the second ball 51 are respectively seated in the first rail groove 61 and the second rail groove 62 of the slide end 64. Accordingly, when the swivel plate 70 and the swivel rail 60 are rotated together, the slide end 64 is slidably moved in the circumferential direction by rolling guide of the first ball 41 and the second ball 51, thereby making it possible to achieve smooth rotation of the swivel rail 60 for swiveling of a seat.

However, the above-described seat swivel device of the related has the following problems.

When a load of a passenger seated on a seat is concentrated on the outer peripheral ends of the swivel plate 70 and the swivel rail 60 during rotation of the swivel rail 60, there is a problem in that sagging and deformation of the swivel rail 60 occurs.

More specifically, the mounting plate 63, which is the outer peripheral end of the swivel rail 60, is in a state of floating apart from the first fixing plate 20, as shown in FIG. 1. In this case, when a load of a passenger seated on a seat is concentrated on the mounting plate 63, there is a problem in that the mounting plate 63 sags downwards and is deformed with respect to the slide end 64 inserted into the space between the first ball 41 and the second ball 51 and configured to serve as a support point.

Further, when the mounting plate 63 of the swivel rail 60 repeatedly sags downwards, a load may be transferred not only to the mounting plate 63 but also to the slide end 64 inserted into the space between the first ball 41 and the second ball 51, which leads to deformation of the mounting plate 63 and the slide end 64. Accordingly, the slide end 64 may not smoothly slide between the first ball 41 and the second ball 51. Consequently, vibration and noise may be generated during seat swivel operation.

The above information disclosed in this Background section is only for enhancement of understanding of the background of the disclosure, and therefore it may contain information that does not form the prior art that is already known in this country to a person of ordinary skill in the art.

SUMMARY OF THE DISCLOSURE

The present device has been made in an effort to solve the above-described problems associated with the prior art, and it is an object of the present disclosure to provide a seat swivel device for a vehicle, configured to improve a swivel rail so as to have a structure including an inner slide end of the swivel rail and an outer slide end thereof respectively formed on the inner side of a mounting plate and the outer side thereof, to allow the inner slide end to be inserted into and coupled to a space between a first ball and a second ball, to allow the outer slide end to be inserted into and coupled to a space between a third ball and a fourth ball, and to cause a load of a passenger seated on a seat to be evenly dispersed and supported by the inner slide end and the outer slide through the mounting plate, thereby making it possible to reliably prevent occurrence of sagging, deformation, and vibration in the swivel rail or the like during seat swivel operation.

In one aspect, the present disclosure provides a seat swivel device for a vehicle, the seat swivel device including a support plate mounted on a floor panel or a seat rail, a first fixing plate mounted on an upper surface of the support plate, a second fixing plate stacked on and assembled with an inner peripheral end of the first fixing plate, a third fixing plate stacked on and assembled with an outer peripheral end of the second fixing plate, a swivel rail including a mounting plate, an inner slide end formed on an inner side of the mounting plate and disposed between the first fixing plate and the second fixing plate so as to be slidably supported by a ball of a retainer, and an outer slide end formed on an outer side of the mounting plate and disposed between the first fixing plate and the third fixing plate so as to be slidably supported by a ball of a retainer, and a swivel plate stacked on and assembled with an upper surface of the mounting plate.

In a preferred embodiment, the inner slide end may be formed into a shape bent downwards from an inner end of the mounting plate and further bent in an inner direction, and the outer slide end may be formed into a shape bent downwards from an outer end of the mounting plate and further bent in an outward direction.

In another preferred embodiment, each of the inner slide end and the outer slide end may disperse, when a load is applied to the mounting plate through the swivel plate, the load and may be supported by the ball of the retainer.

In still another preferred embodiment, the retainer may include a first retainer having a first ball disposed between the first fixing plate and the inner slide end, a second retainer having a second ball disposed between the second fixing plate and the inner slide end, a third retainer having a third ball disposed between the first fixing plate and the outer slide end, and a fourth retainer having a fourth ball disposed between the third fixing plate and the outer slide end.

In yet another preferred embodiment, the first fixing plate may have a first seating groove formed at a location between an outer peripheral end of the first fixing plate and an inner peripheral end thereof and configured to allow a lower portion of the first ball to be rollably seated therein, and the inner slide end may have a first rail groove formed on a lower surface thereof and configured to allow an upper portion of the first ball to be rollably seated therein.

In still yet another preferred embodiment, the second fixing plate may have a second seating groove formed on a lower surface of the outer peripheral end thereof and configured to allow an upper portion of the second ball to be rollably seated therein, and the inner slide end may have a second rail groove formed on an upper surface thereof and configured to allow a lower portion of the second ball to be rollably seated therein.

In a further preferred embodiment, the first fixing plate may have a third seating groove formed on an upper surface of an outer peripheral end thereof and configured to allow a lower portion of the third ball to be rollably seated therein, and the outer slide end may have a third rail groove formed on a lower surface thereof and configured to allow an upper portion of the third ball to be rollably seated therein.

In another further preferred embodiment, the third fixing plate may have a fourth seating groove formed on a lower surface of an inner peripheral end thereof and configured to allow an upper portion of the fourth ball to be rollably seated therein, and the outer slide end may have a fourth rail groove formed on an upper surface thereof and configured to allow a lower portion of the fourth ball to be rollably seated therein.

Other aspects and preferred embodiments of the device are discussed infra.

It is understood that the terms "vehicle", "vehicular", and other similar terms as used herein are inclusive of motor vehicles in general, such as passenger automobiles including sport utility vehicles (SUV), buses, trucks, various commercial vehicles, watercraft including a variety of boats and ships, aircraft, and the like, and include hybrid vehicles, electric vehicles, plug-in hybrid electric vehicles, hydrogen-powered vehicles, and other alternative fuel vehicles (e.g., fuels derived from resources other than petroleum). As referred to herein, a hybrid vehicle is a vehicle that has two or more sources of power, for example, vehicles powered by both gasoline and electricity.

The above and other features of the device are discussed infra.

BRIEF DESCRIPTION OF THE DRAWINGS

The above and other features of the present device will now be described in detail with reference to certain exemplary embodiments thereof illustrated in the accompanying drawings which are given hereinbelow by way of illustration only, and thus are not limitative of the present device, and wherein.

Figure 1:
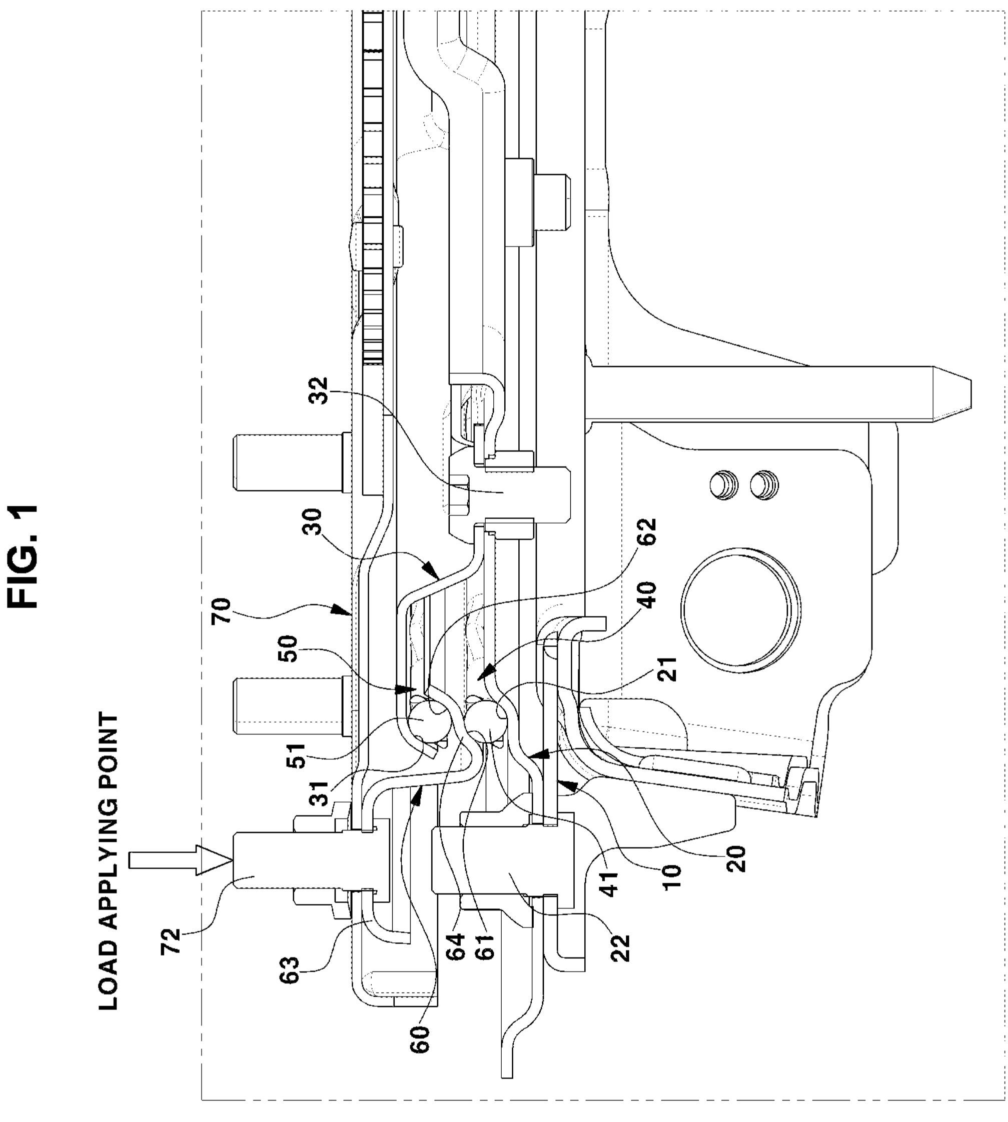
FIG. 1 is an enlarged cross-sectional view of a main part of a conventional seat swivel device.

Reference numerals set forth in the Drawings include reference to the following elements as further discussed below:

It should be understood that the appended drawings are not necessarily to scale, presenting a somewhat simplified representation of various preferred features illustrative of the basic principles of the present device. The specific design features of the present device as disclosed herein, including, for example, specific dimensions, orientations, locations, and shapes will be determined in part by the particular intended application and use environment.

In the figures, reference numbers refer to the same or equivalent parts of the present device throughout the several figures of the drawing.

DETAILED DESCRIPTION

Hereinafter, reference will be made in detail to various embodiments of the present device, examples of which are illustrated in the accompanying drawings and described below.

Figure 2:
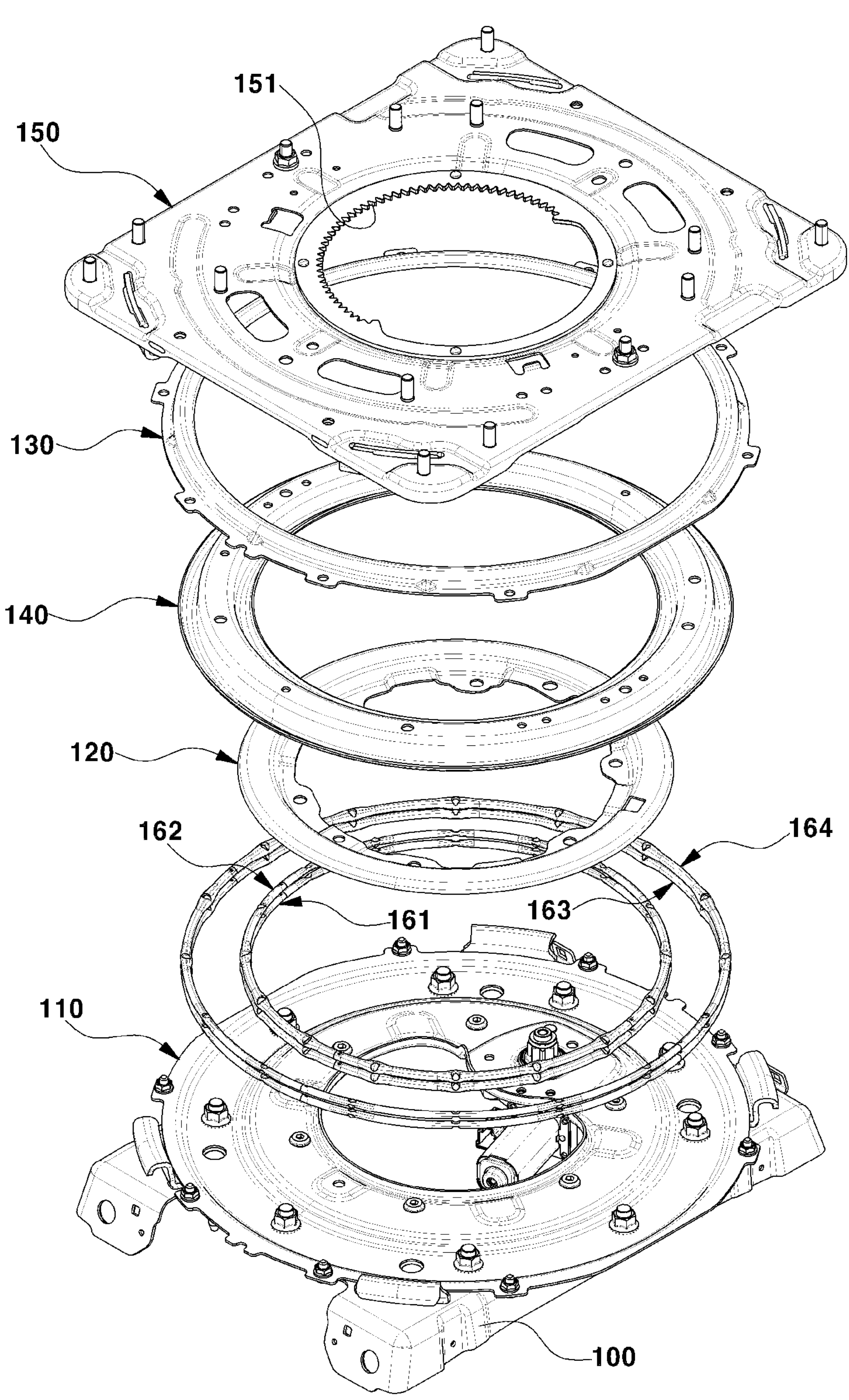
FIG. 2 is an exploded perspective view showing a seat swivel device according to the present device.
Figure 3:
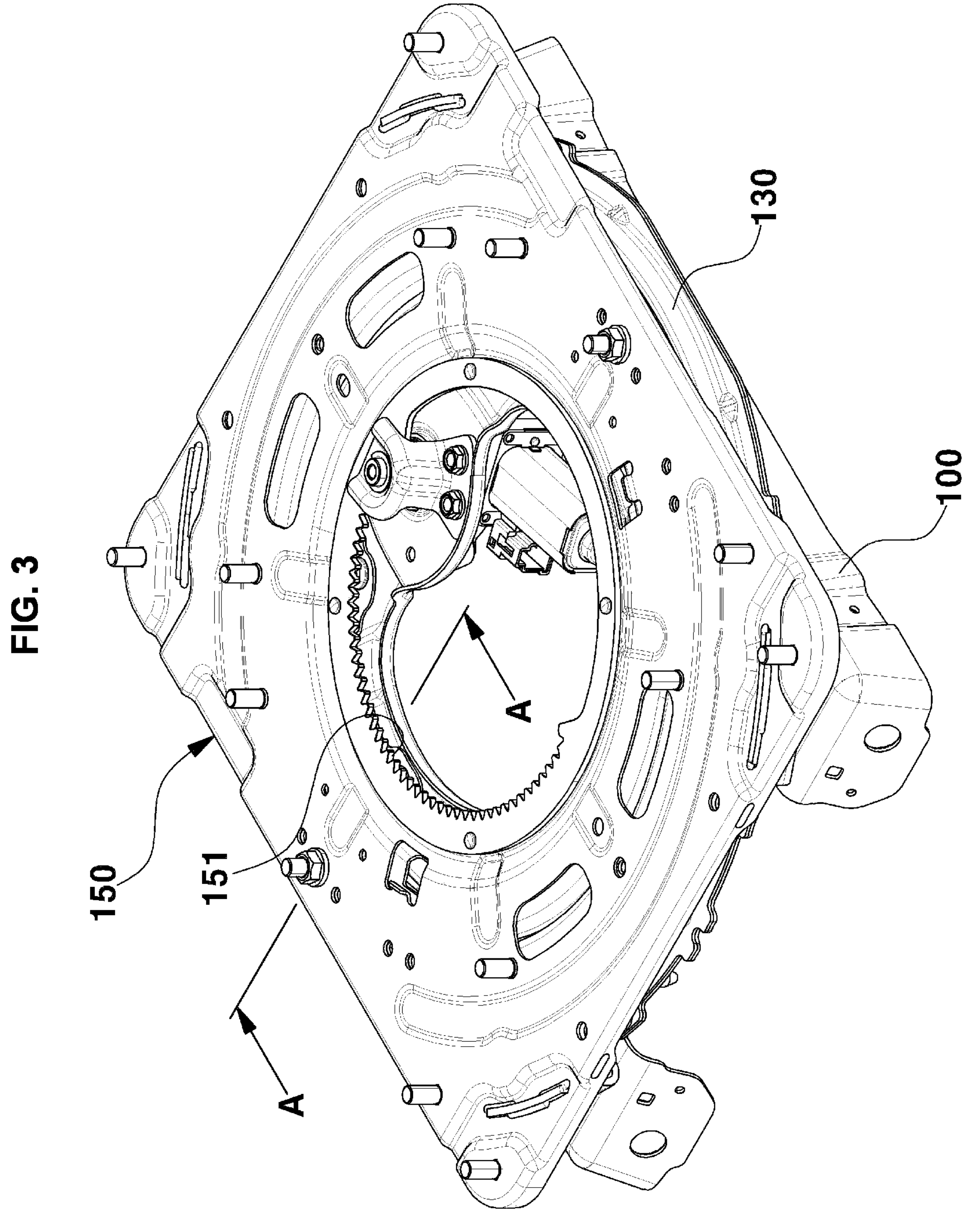
FIG. 3 is an assembled perspective view showing the seat swivel device according to the present device.
Figure 4:
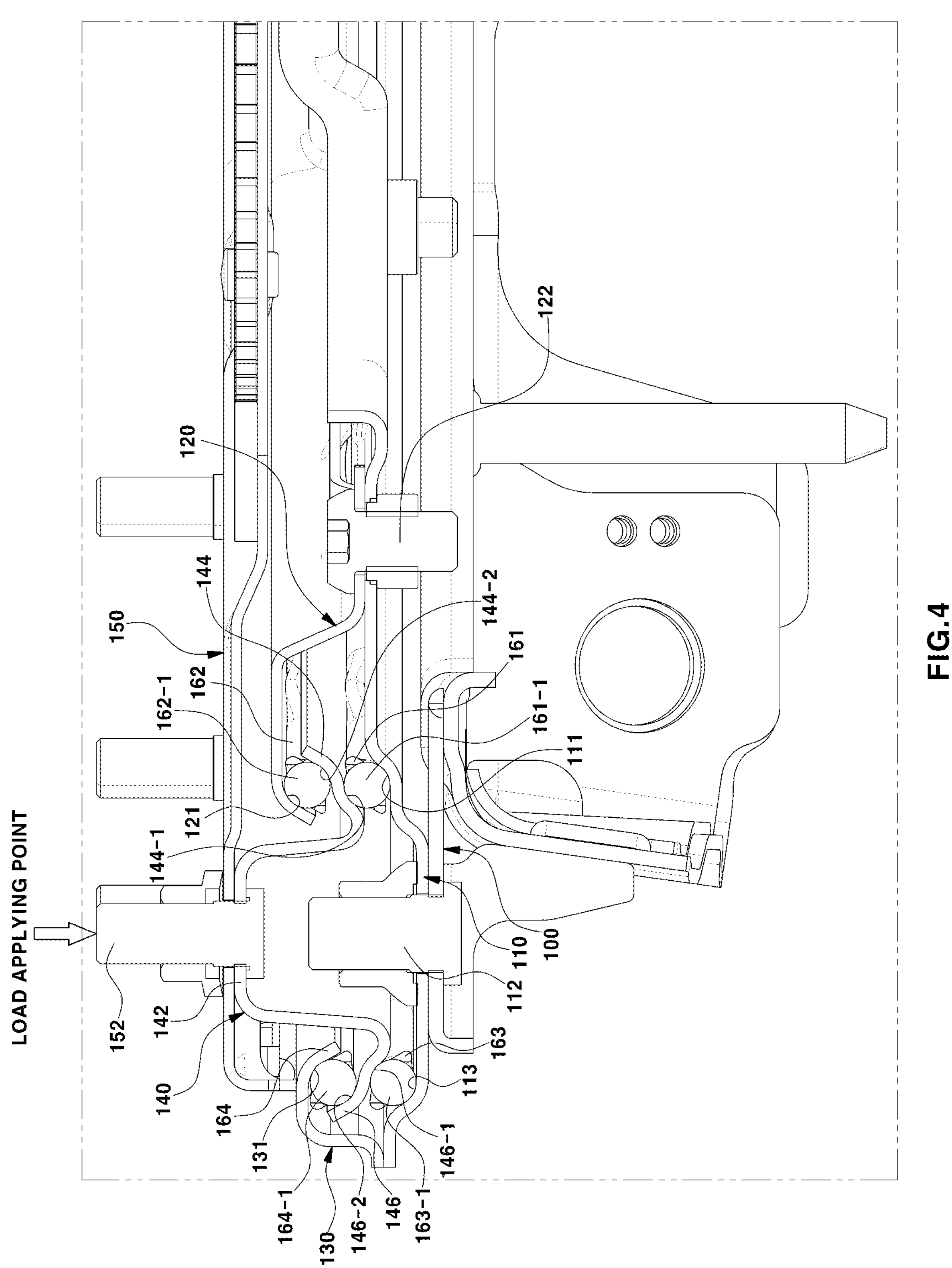
FIG. 4 is an enlarged cross-sectional view of a main part of the seat swivel device according to the present device.

FIGS. 2 and 3 are perspective views showing a seat swivel device according to the present device, and FIG. 4 is an enlarged cross-sectional view of a main part of the seat swivel device according to the present device.

The seat swivel device according to the present device is assembled in a fixed state by sequentially stacking a support plate 100, a first fixing plate 110, a second fixing plate 120, and a third fixing plate 130. Further, the seat swivel device has a structure in which a swivel rail 140 and a swivel plate 150 are rotatably assembled.

As shown in FIG. 4, the first fixing plate 110 is mounted on the upper surface of the support plate 100, the second fixing plate 120 is stacked on and assembled with the inner peripheral end of the first fixing plate 110, and the third fixing plate 130 is stacked on and assembled with the outer peripheral end of the second fixing plate 120.

The support plate 100 may be fixedly mounted on the floor panel of the vehicle interior. Alternatively, the support plate 100 may be mounted on a seat rail mounted on the floor panel so as to be movable in the forward-and-rearward direction.

The first fixing plate 110 is stacked on the upper surface of the support plate 100 and is fixedly mounted thereon through a first bolt 112 or the like. Further, the second fixing plate 120 is stacked on the upper surface of the first fixing plate 110 and is fixedly mounted thereon through a second bolt 122 or the like.

That is, the outer peripheral end of the support plate 100 and the outer peripheral end of the first fixing plate 110 are in close contact with each other so as to be coupled to each other by the first bolt 112, and the inner peripheral end of the first fixing plate 110 and the inner peripheral end of the second fixing plate 120 are in close contact with each other so as to be coupled to each other by the second bolt 122.

Here, the outer peripheral end of the second fixing plate 120 is bent more than two steps upwards from the inner peripheral end thereof so as to be spaced apart from the upper surface of the first fixing plate 110 by a predetermined distance.

Particularly, the third fixing plate 130 is stacked on the upper surface of the first fixing plate 110 and is further mounted thereon through welding or the like.

That is, the outer peripheral end of the first fixing plate 110 and the outer peripheral end of the third fixing plate 130 are in close contact with each other so as to be coupled to each other by welding or the like.

In this case, the inner peripheral end of the third fixing plate 130 is bent more than two steps upwards so as to be spaced apart from the upper surface of the first fixing plate 110 by a predetermined distance.

The swivel rail 140 is a rotatable component for a seat swivel operation and has a structure in which a mounting plate 142 having a horizontal plate shape, an inner slide end 144 bent downwards from the inner end of the mounting plate 142 and further bent inwards, and an outer slide end 146 bent downwards from the outer end of the mounting plate 142 and further bent outwards are formed to be integrated with each other.

In addition, the swivel plate 150 rotating with the swivel rail 140 for a seat swivel operation is stacked on and assembled with the upper surface of the mounting plate 142 by a third bolt 152.

Particularly, the inner slide end 144 is disposed between the first fixing plate 110 and the second fixing plate 120 so as to be slidably supported by balls of a retainer. Further, the outer slide end 146 is disposed between the first fixing plate 110 and the third fixing plate 130 so as to be slidably supported by balls of a retainer.

To this end, the retainer has a structure in which a plurality of balls are rollably stored therein at equal intervals in the circumferential direction. More specifically, the retainer may include a first retainer 161 having a first ball 161-1 disposed between the first fixing plate 110 and the inner slide end 144 of the swivel rail 140, a second retainer 162 having a second ball 162-1 disposed between the second fixing plate 120 and the inner slide end 144 of the swivel rail 140, a third retainer 163 having a third ball 163-1 disposed between the first fixing plate 110 and the outer slide end 146 of the swivel rail 140, and a fourth retainer 164 having a fourth ball 164-1 disposed between the third fixing plate 130 and the outer slide end 146 of the swivel rail 140.

In addition, a first seating groove 111 configured to allow the lower portion of the first ball 161-1 to be rollably seated therein is formed at a location between the outer peripheral end and the inner peripheral end on the upper surface of the first fixing plate 110. Further, a first rail groove 144-1 configured to allow the upper portion of the first ball 161-1 to be rollably seated therein is formed on the lower surface of the inner slide end 144.

In addition, a second seating groove 121 configured to allow the upper portion of the second ball 162-1 to be rollably seated therein is formed on the lower surface of the outer peripheral end of the second fixing plate 120, and a second rail groove 144-2 configured to allow the lower portion of the second ball 162-1 to be rollably seated therein is formed on the upper surface of the inner slide end 144.

Accordingly, the first ball 161-1 is in rollable contact with the first rail groove 144-1 of the inner slide end 144, and the second ball 162-1 is in rollable contact with the second rail groove 144-2, thereby enabling the inner slide end 144 to be slidably moved in the circumferential direction between the first ball 161-1 and the second ball 162-1.

In addition, a third seating groove 113 configured to allow the lower portion of the third ball 163-1 to be rollably seated therein is formed on the upper surface of the outer peripheral end of the first fixing plate 110, and a third rail groove 146-1 configured to allow the upper portion of the third ball 163-1 to be rollably seated therein is formed on the lower surface of the outer slide end 146.

Furthermore, a fourth seating groove 131 configured to allow the upper portion of the fourth ball 164-1 to be rollably seated therein is formed on the lower surface of the inner peripheral end of the third fixing plate 130, and a fourth rail groove 146-2 configured to allow the lower portion of the fourth ball 164-1 to be rollably seated therein is formed on the upper surface of the outer slide end 146.

Accordingly, the third ball 161-3 is in rollable contact with the third rail groove 146-1 of the outer slide end 146, and the fourth ball 164-1 is in rollable contact with the fourth rail groove 146-2, thereby enabling the outer slide end 146 to be slidably moved in the circumferential direction between the third ball 163-1 and the fourth ball 164-1.

Moreover, when a load of a passenger is applied to the mounting plate 142 of the swivel rail 140 through the swivel plate 150, the inner slide end 144 is in a state of being inserted into a space between the first ball 161-1 and the second ball 162-1 so as to be supported by the first ball 161-1 and the second ball 162-1, and simultaneously, the outer slide end 146 is inserted into a space between the third ball 163-1 and the fourth ball 164-1 so as to be supported by the third ball 163-1 and the fourth ball 164-1. Accordingly, the inner slide end 144 and the outer slide end 146 serve to support and evenly disperse the load.

Meanwhile, although not shown, a seat cushion frame of a seat is stacked on and coupled to the upper surface of the swivel plate 150.

In addition, an inner gear 151 is formed on the inner diameter of the swivel plate 150, and an output gear of a drive motor is engaged with the inner gear 151, thereby making it possible to rotate the swivel plate 150 when rotational force of the drive motor is transmitted to the inner gear 151 through the output gear.

Here, an operation flow of the seat swivel device of the present disclosure configured as described above will be described as follows.

First, rotational force resulting from driving of the drive motor is transmitted to the inner gear 151 through the output gear, thereby rotating the swivel plate 150, and simultaneously, the swivel rail 140 coupled to the swivel plate 150 may be rotated.

When the swivel rail 140 is rotated, the first ball 161-1 is in rollable contact with the first rail groove 144-1 of the inner slide end 144, and simultaneously, the second ball 162-1 is in rollable contact with the second rail groove 144-2 thereof, thereby enabling the inner slide end 144 to be slidably moved in the circumferential direction between the first ball 161-1 and the second ball 162-1.

When the swivel rail 140 is rotated, the third ball 163-1 is in rollable contact with the third rail groove 146-1 of the outer slide end 146, and simultaneously, the fourth ball 164-1 is in rollable contact with the fourth rail groove 146-2 thereof, thereby enabling the outer slide end 146 to be slidably moved in the circumferential direction between the third ball 163-1 and the fourth ball 164-1.

Therefore, stable rotational movement of the inner slide end 144 and the outer slide end 146 of the swivel rail 140 enables the swivel rail 140 and swivel plate 150 to be smoothly rotated in the desired direction without vibration. Further, since a seat cushion frame stacked on the swivel plate 150 is also rotated, a seat swivel operation may be performed stably and smoothly.

Particularly, even if a load of a passenger seated on a seat or external force is concentrated on the mounting plate 142 of the swivel rail 140 through the swivel plate 150, the load may be evenly dispersed to the inner slide end 144 and the outer slide end 146 respectively formed on the inner side of the mounting plate 142 and the outer side thereof, thereby making it possible to reliably prevent occurrence of sagging, deformation, and vibration in a swivel rail due to passenger load or external force.

Moreover, the inner slide end 144 of the swivel rail 140 is inserted into the space between the first ball 161-1 and the second ball 162-1 so as to be supported by the first ball 161-1 and the second ball 162-1, and the outer slide end 146 of the swivel rail 140 is inserted into the space between the third ball 163-1 and the fourth ball 164-1 so as to be supported by the third ball 163-1 and the fourth ball 164-1. Accordingly, a load bearing point of the swivel rail 140 may be each of the inner slide end 144 and the outer slide end 146 respectively formed on the inner side of the mounting plate 142 and the outer side of the mounting plate 142, thereby making it possible to improve cross-sectional rigidity and load bearing rigidity of the swivel rail.

As is apparent from the above description, the present device provides the following effects.

First, even if a load of a passenger seated on a seat is concentrated on a mounting plate of a swivel rail, the load may be dispersed to and supported by an inner slide end and an outer slide end respectively formed on the inner side of the mounting plate and the outer side thereof, thereby making it possible to reliably prevent occurrence of sagging, deformation, and vibration in the swivel rail due to passenger load.

Second, the inner slide end of the swivel rail is inserted into a space between a first ball and a second ball so as to be supported by the first ball and the second ball, and simultaneously, the outer slide end of the swivel rail is inserted into a space between a third ball and a fourth ball so as to be supported by the third ball and the fourth ball. Accordingly, a load bearing point of the swivel rail may be each of the inner slide end and the outer slide end respectively formed on the inner side of the mounting plate and the outer side thereof, thereby making it possible to improve cross-sectional rigidity and load bearing rigidity of the swivel rail.

Third, since sagging and deformation of the swivel rail is prevented, the inner slide end may smoothly slide in the circumferential direction between the first and second balls, and the outer slide end may smoothly slide in the circumferential direction between the third and fourth balls, thereby making it possible to smoothly perform a seat swivel operation without vibration and noise.

The present device has been described in detail with reference to preferred embodiments thereof. However, it will be appreciated by those skilled in the art that changes may be made in these embodiments without departing from the principles and spirit of the present device, the scope of which is defined in the appended claims and equivalents thereto.

What is claimed is:

1. A seat swivel device for a vehicle, the seat swivel device comprising:
- a support plate;
- a first fixing plate mounted on an upper surface of the support plate;
- a second fixing plate stacked on and assembled with an inner peripheral end of the first fixing plate;
- a third fixing plate stacked on and assembled with an outer peripheral end of the second fixing plate;
- a retainer housing a plurality of balls that are rollably stored;
- a swivel rail comprising a mounting plate, an inner slide end formed on an inner side of the mounting plate and disposed between the first fixing plate and the second fixing plate so as to be slidably supported by inner balls of the retainer, and an outer slide end formed on an outer side of the mounting plate and disposed between the first fixing plate and the third fixing plate so as to be slidably supported by outer balls of the retainer; and a swivel plate stacked on and assembled with an upper surface of the mounting plate, wherein the inner slide end is slidably supported by first balls of the inner balls and second balls of the inner balls, and the outer slide end is slidably supported by third balls of the outer balls and fourth balls of the outer balls.

2. The seat swivel device of claim 1, wherein the inner slide end is formed into a shape bent downwards from an inner end of the mounting plate and further bent in an inner direction, and the outer slide end is formed into a shape bent downwards from an outer end of the mounting plate and further bent in an outward direction.

3. The seat swivel device of claim 1, wherein each of the inner slide end and the outer slide end disperses a load when the load is applied to the mounting plate through the swivel plate, and the inner slide end and the outer slide end are supported by the inner balls and the outer balls of the retainer respectively.

4. The seat swivel device of claim 1, wherein the retainer comprises:

a first retainer housing the first balls of the inner balls disposed between the first fixing plate and the inner slide end;

a second retainer housing the second balls of the inner balls disposed between the second fixing plate and the inner slide end;

a third retainer housing the third balls of the outer balls disposed between the first fixing plate and the outer slide end; and a fourth retainer housing the fourth balls of the outer balls disposed between the third fixing plate and the outer slide end.

5. The seat swivel device of claim 4, wherein the first fixing plate has a first seating groove formed at a location between an outer peripheral end of the first fixing plate and an inner peripheral end thereof and configured to allow a lower portion of the first balls to be rollably seated therein, and the inner slide end has a first rail groove formed on a lower surface thereof and configured to allow an upper portion of the first balls to be rollably seated therein.

6. The seat swivel device of claim 4, wherein the second fixing plate has a second seating groove formed on a lower surface of the outer peripheral end thereof and configured to allow an upper portion of the second balls to be rollably seated therein, and the inner slide end has a second rail groove formed on an upper surface thereof and configured to allow a lower portion of the second balls to be rollably seated therein.

7. The seat swivel device of claim 4, wherein the first fixing plate has a third seating groove formed on an upper surface of an outer peripheral end thereof and configured to allow a lower portion of the third balls to be rollably seated therein, and the outer slide end has a third rail groove formed on a lower surface thereof and configured to allow an upper portion of the third balls to be rollably seated therein.

8. The seat swivel device of claim 4, wherein the third fixing plate has a fourth seating groove formed on a lower surface of an inner peripheral end thereof and configured to allow an upper portion of the fourth balls to be rollably seated therein, and the outer slide end has a fourth rail groove formed on an upper surface thereof and configured to allow a lower portion of the fourth balls to be rollably seated therein.

9. The seat swivel device of claim 1, wherein the support plate is mounted on a floor panel or a seat rail.

10. A seat swivel device for a seat, the seat swivel device comprising:

a support plate;

a first fixing plate mounted on an upper surface of the support plate;

a second fixing plate stacked on and assembled with an inner peripheral end of the first fixing plate;

a third fixing plate stacked on and assembled with an outer peripheral end of the second fixing plate;

a retainer housing a plurality of balls that are rollably stored; and a swivel rail comprising a mounting plate, the mounting plate including an inner slide end and an outer slide end, the inner slide end formed on an inner side of the mounting plate and disposed between the first fixing plate and the second fixing plate so as to be slidably supported by inner balls of the retainer, and the outer slide end formed on an outer side of the mounting plate and disposed between the first fixing plate and the third fixing plate so as to be slidably supported by outer balls of the retainer;

wherein the first fixing plate, the second fixing plate, the third fixing plate, the retainer and the swivel rail are annular-shaped, wherein the inner balls are positioned radially inward of retainer, and the outer balls are positioned radially outward of retainer, wherein a load applied on the seat is configured to be transferred to of the mounting plate and to be supported by the inner balls and the outer balls, and wherein the inner slide end is slidably supported by first balls of the inner balls and second balls of the inner balls and the outer slide end is slidably supported by third balls of the outer balls and fourth balls of the outer balls.

11. The seat swivel device of claim 10, wherein the inner slide end is formed into a shape bent downwards from an inner end of the mounting plate and further bent in an inner direction, and the outer slide end is formed into a shape bent downwards from an outer end of the mounting plate and further bent in an outward direction.

12. The seat swivel device of claim 10, wherein each of the inner slide end and the outer slide end disperses a load when the load is applied to the mounting plate through the swivel plate, and the inner slide end and the outer slide end are supported by the inner balls and the outer balls of the retainer respectively.

13. The seat swivel device of claim 10, wherein the retainer comprises:

a first retainer housing the first balls of the inner balls disposed between the first fixing plate and the inner slide end;

a second retainer housing the second balls of the inner balls disposed between the second fixing plate and the inner slide end;

a third retainer housing the third balls of the outer balls disposed between the first fixing plate and the outer slide end; and a fourth retainer housing the fourth balls of the outer balls disposed between the third fixing plate and the outer slide end.

14. The seat swivel device of claim 13, wherein the first fixing plate has a first seating groove formed at a location between an outer peripheral end of the first fixing plate and an inner peripheral end thereof and configured to allow a lower portion of the first balls to be rollably seated therein, and the inner slide end has a first rail groove formed on a lower surface thereof and configured to allow an upper portion of the first balls to be rollably seated therein.

15. The seat swivel device of claim 13, wherein the second fixing plate has a second seating groove formed on a lower surface of the outer peripheral end thereof and configured to allow an upper portion of the second balls to be rollably seated therein, and the inner slide end has a second rail groove formed on an upper surface thereof and configured to allow a lower portion of the second balls to be rollably seated therein.

16. The seat swivel device of claim 13, wherein the first fixing plate has a third seating groove formed on an upper surface of an outer peripheral end thereof and configured to allow a lower portion of the third balls to be rollably seated therein, and the outer slide end has a third rail groove formed on a lower surface thereof and configured to allow an upper portion of the third balls to be rollably seated therein.

17. The seat swivel device of claim 13, wherein the third fixing plate has a fourth seating groove formed on a lower surface of an inner peripheral end thereof and configured to allow an upper portion of the fourth balls to be rollably seated therein, and the outer slide end has a fourth rail groove formed on an upper surface thereof and configured to allow a lower portion of the fourth balls to be rollably seated therein.

18. The seat swivel device of claim 10, wherein the support plate is mounted on a floor panel or a seat rail.

* * * * *